(12) United States Patent
Matsunaga et al.

(10) Patent No.: US 9,496,100 B2
(45) Date of Patent: Nov. 15, 2016

(54) SWITCHGEAR STATE DISPLAY DEVICE

(75) Inventors: Toshihiro Matsunaga, Chiyoda-ku (JP); Toru Kimura, Chiyoda-ku (JP); Hideki Miyatake, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 150 days.

(21) Appl. No.: 14/236,333

(22) PCT Filed: Apr. 5, 2012

(86) PCT No.: PCT/JP2012/059313
§ 371 (c)(1),
(2), (4) Date: Jan. 31, 2014

(87) PCT Pub. No.: WO2013/077009
PCT Pub. Date: May 30, 2013

(65) Prior Publication Data
US 2014/0174898 A1 Jun. 26, 2014

(30) Foreign Application Priority Data
Nov. 21, 2011 (JP) .................................. 2011-253405

(51) Int. Cl.
*H01H 9/16* (2006.01)
*H02B 11/10* (2006.01)

(52) U.S. Cl.
CPC ................. *H01H 9/16* (2013.01); *H02B 11/10* (2013.01)

(58) Field of Classification Search
CPC ................................... H01H 9/16; H01H 71/04
(Continued)

(56) References Cited

U.S. PATENT DOCUMENTS 4,849,590 A * 7/1989 Becker .................... H01H 1/54
200/10
5,517,381 A * 5/1996 Guim ................... H01H 1/0015
361/102
(Continued)

FOREIGN PATENT DOCUMENTS

DE         1 665 706 A     4/1971
DE    199 19 418 A1    11/2000
(Continued)

OTHER PUBLICATIONS

International Search Report (PCT/ISA/210) mailed on May 29, 2012, by the Japanese Patent Office as the International Searching Authority for International Application No. PCT/JP2012/059313.
(Continued)

*Primary Examiner* — Edwin A. Leon
*Assistant Examiner* — Iman Malakooti
(74) *Attorney, Agent, or Firm* — Buchanan Ingersoll & Rooney PC

(57) ABSTRACT

Included are: a movable plate which is coupled to a main shaft of the switchgear and performs motion in accordance with the movement of the main shaft; an ON/OFF display plate in which a display showing the state of the switchgear, such as "ON"/"OFF," is provided on each of different two faces, and mechanically rotates or performs linear motion and thus displaying the opening/closing state of the contact; and an ON/OFF display plate link which is mechanically connected to the movable plate and the ON/OFF display plate and converts the motion of the movable plate to transfer to the ON/OFF display plate. The display of the ON/OFF display plate is arranged at a tilt toward the upper side or the lower side so as to point at an optional angle.

12 Claims, 6 Drawing Sheets

(58) Field of Classification Search
USPC .............. 200/308, 237, 330, 332, 400, 401
See application file for complete search history.

(56) References Cited

U.S. PATENT DOCUMENTS 5,981,887 A * 11/1999 Robarge ................ H01H 71/04
200/308
6,005,208 A    12/1999 Castonguay

FOREIGN PATENT DOCUMENTS

| JP | 46-4905      | 2/1971  |
|----|--------------|---------|
| JP | 58-145195 A  | 8/1983  |
| JP | 4-124726 U   | 11/1992 |
| JP | H07-087633 A | 3/1995  |
| JP | H10-241515 A | 9/1998  |
| JP | 2000-236603 A| 8/2000  |
| JP | 2006-093005 A| 4/2006  |

OTHER PUBLICATIONS

Chinese Office Action issued on Jun. 30, 2015, by the Chinese Patent Office in corresponding Chinese Patent Application No. 201280044709.0, and an English Translation of the Office Action. (13 pages).

Office Action issued on May 20, 2016, by the German Patent Office in corresponding German Patent Application No. 11 2012 004 843.1 and English Translation of the Office Action. (10 pages).

\* cited by examiner

SWITCHGEAR STATE DISPLAY DEVICE

TECHNICAL FIELD

The present invention relates to a state display device which displays the opening/closing state or the state of the number of opening/closing times, etc. of a contact in a switch such as a circuit breaker and a load switch, or a switchboard which contains these switches (hereinafter, these are named generically as "switchgear"), which are for use as protection of electric power transmission and reception/distribution facilities.

BACKGROUND ART

In a generally used switchgear, the structure of a state display device which mechanically displays the opening/closing state and the number of opening/closing times of a contact is configured, for example, as shown in FIG. 9 and FIG. 10. More specifically, the state display device includes: an ON/OFF display plate 7 which is provided with a display of "ON"/"OFF" on each of two different angle faces, and displays the opening/closing state of the contact by mechanically rotating; and, similarly, a mechanical operation counter 12 which counts and displays the number of opening/closing times by rotation of a driving lever 13. Both of the ON/OFF display plate 7 and the operation counter 12 face a front cover 18 of the switchgear and are arranged so as to be able to confirm the state display from the front of the switchgear through a display window 19 provided on the front cover 18.

The ON/OFF display plate 7 and the operation counter 12 are coupled to a main shaft of the switchgear via a movable plate 5 and a tension spring 14; and the ON/OFF display plate 7 and the driving lever 13 of the operation counter 12 are rotated in response to the opening/closing operation of the contact to switch the display of "ON"/"OFF" and to count the number of opening/closing times. Such a state display device is also disclosed in Japanese Unexamined Utility Model Publication No. H4-124726 (Patent Document 1).

Furthermore, as other example, in order to electrically input/output information to a control device, there is also an example in which a display device equipped with a cathode ray tube (CRT) and a keyboard is attached with inclined upward so that a worker operates easily (for example, see Patent Document 2).

PRIOR ART DOCUMENT

Patent Document

Patent Document 1: Japanese Unexamined Utility Model Publication No. H4-124726 (FIG. 6, FIG. 7)
Patent Document 2: Japanese Unexamined Patent Publication No. S58-145195 (FIG. 3)

SUMMARY OF THE INVENTION

Problems to be Solved by the Invention

In such switchgear state display devices, for example, in a large-size switchgear and a switchgear in which circuit breakers and/or switches are stacked in two stages in the inside, the display position of the state display device may be located at a position lower or higher than the height of eye line in a state where a worker stands erect at the front of the switchgear.

In that case, the ON/OFF display plate 7 and the operation counter 12 located inside the state display device are pointed to the front of the switchgear; and accordingly, in order to visually check the contents of the display, the worker needs to stoop at the front of the switchgear to put down the height of eye line or to use a stepladder and/or an ascending/descending platform to put up the height of eye line and thus workability is bad, so that a problem exists in that it leads to an increase in physical burden of the worker and deterioration of work safeness.

The present invention has been made to solve the aforementioned problems, and an object of the present invention is to provide a switchgear state display device in which when a worker confirms the contents of a display, a work table and/or a stoop is not required and the contents of a state display can be confirmed in normal work posture.

Means for Solving the Problems

According to the present invention, there is provided a switchgear state display device, including: a display plate which is coupled to a main shaft of a switchgear, and is provided with a display showing the state of the switchgear on each of two faces of a first display face and a second display face in accordance with the movement of the main shaft to point the display face showing the present state of the switchgear, in the first display face or the second display face, toward the direction of a display window of a front cover arranged along a vertical surface by mechanically rotating or performing linear motion; and a display plate link which is coupled to the main shaft of the switchgear and the display plate, and converts the motion of the main shaft to transfer to the display plate. In the switchgear state display device, the coupling position of the display plate and the display plate link is switchably configured at plural points; and the position is changed, whereby an angle formed by the first display face or the second display face on the display side and the vertical surface can be adjustable, and the first display face or the second display face on the non-display side is pointed to an invisible direction through the display window.

Advantageous Effect of the Invention

According to the present invention, when the state display device is placed at a position where a worker looks down or looks up in an upright state at the front of the switchgear, a display plate can be arranged at a tilt in accordance with the angle of worker's eye line and therefore it becomes possible to grasp the operating state of the switchgear easily and safely without stooping down at the front of the switchgear and without putting up the height of the eye line by means of a stepladder and/or an ascending/descending platform.

MODE FOR CARRYING OUT THE INVENTION

Hereinafter, embodiments for carrying out the present invention will be described with reference to FIG. 1 to FIG. 8.

Embodiment 1

The term switchgear in Embodiment 1 means one in which the following are generically named: a switch having an opening/closing contact, such as a circuit breaker, a load switch, a disconnecting switch, a grounding switch, and a contactor, or a switchboard which contains these switches. Furthermore, the operating state of the switchgear has variety in terms of the opening/closing state of the circuit breaker; the ON/OFF state of the disconnecting switch; the ON/OFF state of the grounding switch; electrical states, such as voltage, current, frequency, and power factor; the temperature state of a main circuit conductor; and states, such as the temperature and pressure of insulating gas.

Figure 1:
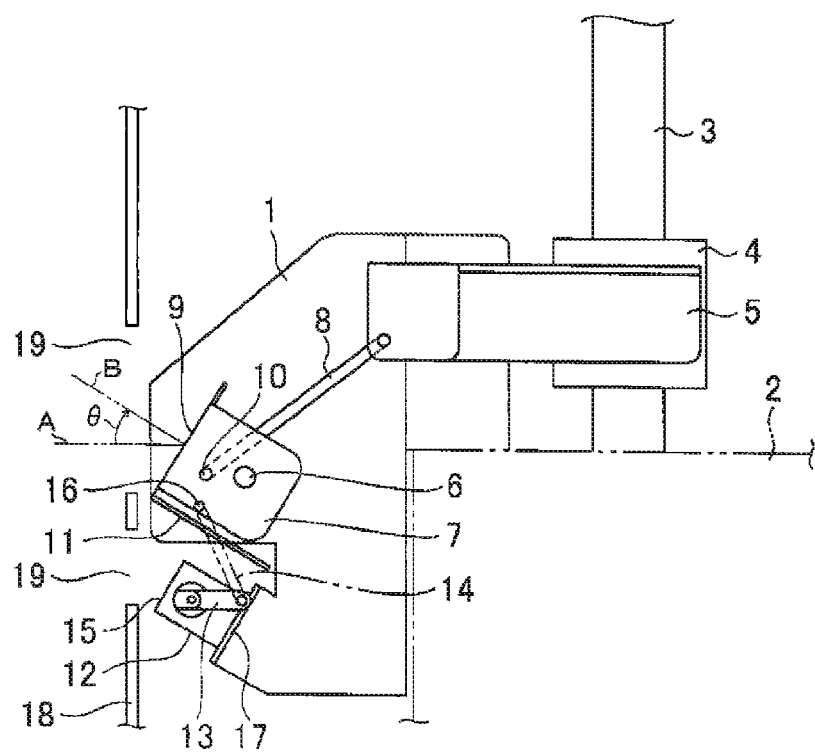
FIG. 1 is a side view showing the contact opening position of a switchgear state display device according to Embodiment 1 of the present invention.

In Embodiment 1, a display device in the opening/closing state of the circuit breaker will be described using the circuit breaker in the switchgear as an example. FIG. 1 is a side view showing the state of the contact opening position of the circuit breaker of a switchgear state display device according to Embodiment 1 of the present invention (the circuit breaker will be described as the example in Embodiment 1).

In FIG. 1, the switchgear state display device according to Embodiment 1 of the present invention is fixed to the front side of an operating mechanism 2 by a frame 1. The operating mechanism 2 is connected to a contact of the circuit breaker (not shown in the drawing) by a main shaft 3, and the opening/closing operation of the contact of the circuit breaker is performed by making the main shaft 3 perform linear motion vertically. A configuration is made such that the main shaft 3 is provided with a connection block 4, a movable plate 5 is attached to the connection block 4, and the movable plate 5 also moves up and down in accordance with the linear motion of the main shaft 3.

On the other hand, the frame 1 holds a rotational shaft 6 and an ON/OFF display plate 7 is placed so as to rotate centering on the rotational shaft 6. The ON/OFF display plate 7 has two faces different in direction by 90 degrees in a rotational direction, and a display of "ON"/"OFF" representing the opening/closing state of the contact is provided on each of the faces. Further, the ON/OFF display plate 7 is coupled to the movable plate 5 via an ON/OFF display plate link 8; and thus, rotation cannot be freely performed. When the switchgear is at a contact opening position or a contact closing position, a display direction is pointed in a predetermined direction in which the position is controlled by the coupling with the ON/OFF display plate link 8. Then, the configuration is made such that a display face of the ON/OFF display plate 7 is visible from a display window 19 provided on a front cover 18.

In FIG. 1, a line B perpendicular to the display face 9 is arranged at a tilt upward by a predetermined angle θ with respect to a horizontal line A, so that the display face 9 can be confirmed without stooping down of a worker.

In FIG. 1, the configuration is made such that the "OFF" display face 9 which is configured as a first display face of the ON/OFF display plate 7 points obliquely upward on the assumption of a case where the worker looks down the state display device from the upper side of the front of the switchgear. However, for example, a plurality of holes (not shown in the drawing) are provided for the coupling position 10 of the ON/OFF display plate 7 shown in FIG. 1; and thus, the coupling position 10 of the ON/OFF display plate 7 and the ON/OFF display plate link 8 is selectively switchably set from a plurality of points. Then, by changing the position, an angle formed by the "OFF" display face 9 and the front cover 18 can be adjustable and the "OFF" display face 9 can be pointed in an optional direction in consideration of a vertical direction from a horizontal eye line of the worker.

Furthermore, the angle formed by the "OFF" display face 9 and the front cover 18 can be changed by also changing the length of the ON/OFF display plate link 8.

Figure 2:
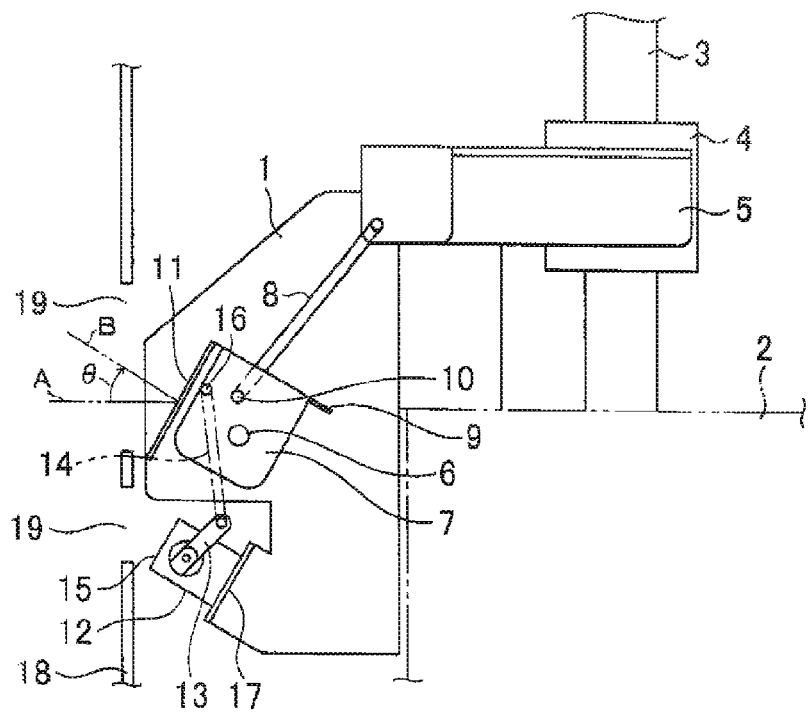
FIG. 2 is a side view showing the contact closing position of the switchgear state display device according to Embodiment 1 of the present invention.
Figure 3:
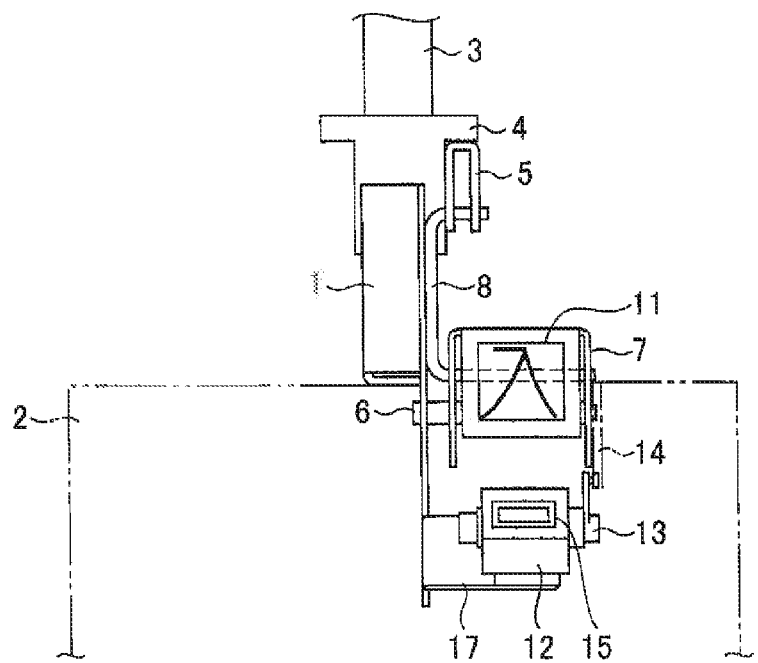
FIG. 3 is a front view showing the contact closing position of the switchgear state display device according to Embodiment 1 of the present invention.

When the circuit breaker moves from a contact opening position to a contact closing position from the state of FIG. 1 by contact closing operation, the movable plate 5 moves upward as shown in FIG. 2, and the ON/OFF display plate 7 rotates in a clockwise direction approximately 90 degrees via the ON/OFF display plate link 8. This makes an "ON" display face 11 which is configured as a second display face of the ON/OFF display plate 7 point obliquely upward this time, more specifically, point toward the worker; and thus, confirmation can be made that the opening/closing state of the contact has been switched from contact opening to contact closing.

Also in this case, the line B perpendicular to the display face 11 is arranged at a tilt upward by the predetermined angle θ with respect to the horizontal line A, so that the display face 11 can be confirmed without stooping down of the worker.

Incidentally, in the above description, the description has been made that the ON/OFF display plate 7 has faces different in direction by 90 degrees in the rotational direction. However, the display of different face by rotation may be set so as to be visible from the display window 19 of the front cover 18; and therefore, 90 degrees is not necessarily needed.

Furthermore, a mechanical operation counter 12 is also attached to the frame 1. A driving lever 13 exists on the side of the operation counter 12 and the leading end of the driving lever 13 is coupled to the ON/OFF display plate 7 by a tension spring 14. When the ON/OFF display plate 7 rotates in a clockwise direction by contact closing operation, the driving lever 13 is drawn by the tension spring 14 to rotate in a counterclockwise direction; and the number of opening/closing times of the contact is counted once at a position rotated 40 to 45 degrees and the driving lever 13 stops. After that, the tension spring 14 extends until the rotation of the ON/OFF display plate 7 stops; and thus, an overload to the driving lever 13 is absorbed. In FIG. 1, the operation counter 12 is also configured such that a display unit of the number of operation times 15 points obliquely upward on the assumption of a case where the worker looks down the state display device from the upper side of the front of the switchgear. However, the display unit of the number of operation times 15 can be pointed in an optional direction by changing the coupling position 16 of the ON/OFF display plate 7 and the tension spring 14 and the angle of an operation counter attachment face 17 of the frame 1.

When the circuit breaker reversely moves from the contact closing position to the contact opening position from the state of FIG. 2 by contact opening operation, the movable plate 5 moves downward as shown in FIG. 1, the ON/OFF display plate 7 rotates in a counterclockwise direction approximately 90 degrees via the ON/OFF display plate link 8, and the "OFF" display face 9 points obliquely upward again. The tension spring 14 which connects the ON/OFF display plate 7 to the driving lever 13 of the operation counter 12 also returns to the position of FIG. 1, the driving lever 13 rotates in a clockwise direction 40 to 45 degrees by a return spring in the operation counter 12 and becomes a state capable of counting the number of opening/closing times again.

Figure 4:
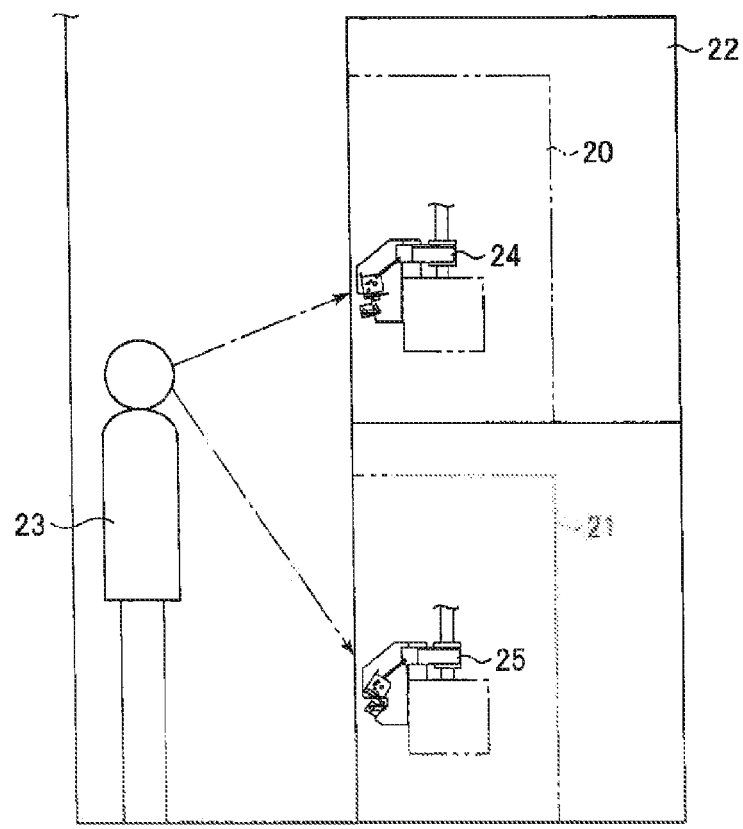
FIG. 4 is a side view showing a state where circuit breakers, each of which is mounted with the switchgear state display device according to Embodiment 1 of the present invention, are stacked in two stages in a switchboard.

As described above, by changing the coupling position 10 of the ON/OFF display plate link 8, the coupling position 16 of the tension spring 14, and the angle of the operation counter of the operation counter attachment face 17 of the frame 1, even in a case where circuit breakers 20 and 21 are stacked in two stages in a switchboard 22 as shown in FIG. 4, the contents of displays of respective state display devices 24 and 25 can be easily confirmed while a worker 23 remains in an upright state.

Incidentally, the description has been made on the circuit breaker as the example of the switchgear in this case; however, the present invention is not limited to this, but the present invention can be applied to all switches such as the load switch, the disconnecting switch, the grounding switch, and the contactor, each of which similarly opens or closes the contact; or can also be applied to a switchboard which contains these devices.

Furthermore, the state display of the contact is "ON"/"OFF," but not limited to this; and a display such as "opening"/"closing" and/or "connection"/"disconnection" may be permissible.

Further, the subject of the state display may be permissible as long as the state display is related to the operating state of the switchgear, for example, the opening/closing state of the circuit breaker; the ON/OFF state of the disconnecting switch; the ON/OFF state of the grounding switch; electrical states, such as voltage, current, frequency, and power factor; the temperature state of the main circuit conductor; and states, such as the temperature and pressure of insulating gas.

Furthermore, in the above embodiment, the "OFF" display face 9 and the "ON" display face 11 of the ON/OFF display plate 7 or the display unit of the number of operation times 15 are placed at the lower side than the horizontal eye line of the worker; and therefore, the "OFF" display face 9, the "ON" display face 11, or the display face of the display unit of the number of operation times 15 is pointed obliquely upward. However, in the case of placing at the upper side than the horizontal eye line of the worker, even when the "OFF" display face 9 and the "ON" display face 11, or the display face of the display unit of the number of operation times 15 is pointed obliquely downward, similar effects can be exhibited.

Embodiment 2

Figure 5:
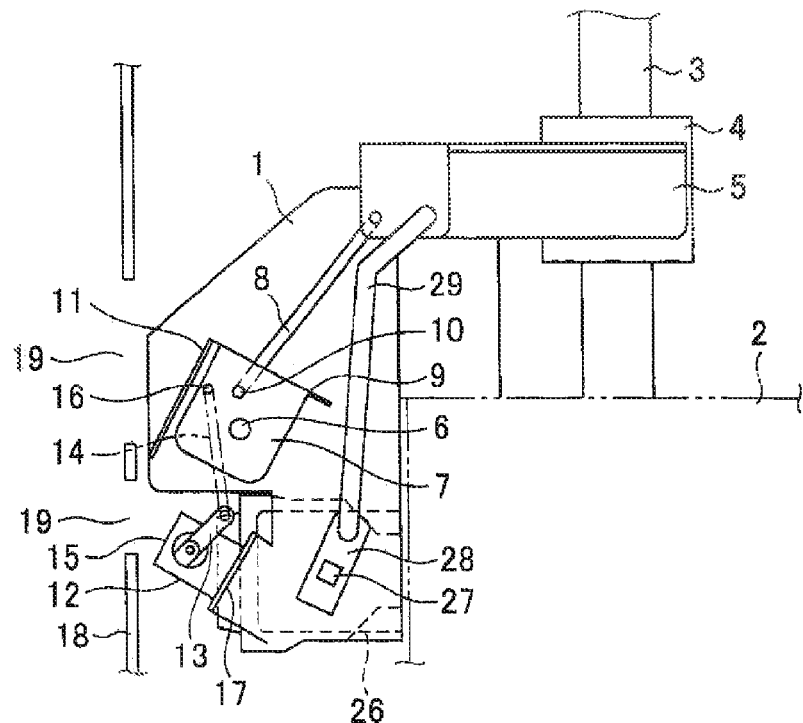
FIG. 5 is a side view showing the contact closing position of a switchgear state display device according to Embodiment 2 of the present invention.
Figure 6:
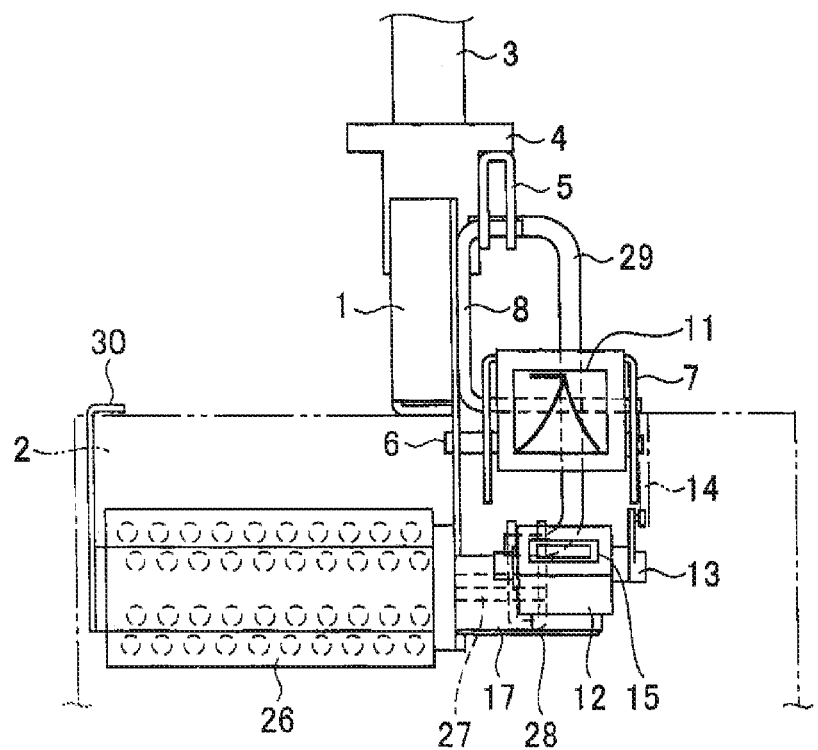
FIG. 6 is a front view showing the contact closing position of the switchgear state display device according to Embodiment 2 of the present invention.

FIG. 5 is a side view showing the contact closing position of a switchgear state display device according to Embodiment 2 of the present invention; and FIG. 6 is a front view showing the same.

In FIG. 5, in the switchgear state display device, a rotary auxiliary switch 26 is attached to an auxiliary frame 30, in addition to an ON/OFF display plate 7 and an operation counter 12. Further, an arm 28 is connected to a rotational shaft 27 of the auxiliary switch 26. The leading end of the arm 28 is coupled to a movable plate 5 via an auxiliary switch link 29. If the movable plate 5 moves up and down by opening/closing operation, the auxiliary switch 26 also rotates at the same time as the ON/OFF display plate 7 and a driving lever 13 of the operation counter 12; and a normally open contact and a normally close contact in the auxiliary switch 26 are switched in accordance with the opening/closing state of a contact.

As described above, according to Embodiment 2, the auxiliary switch 26 can also be switched at the same time as the ON/OFF display plate 7 and the operation counter 12 are switched in response to the opening/closing operation.

Embodiment 3

Figure 7:
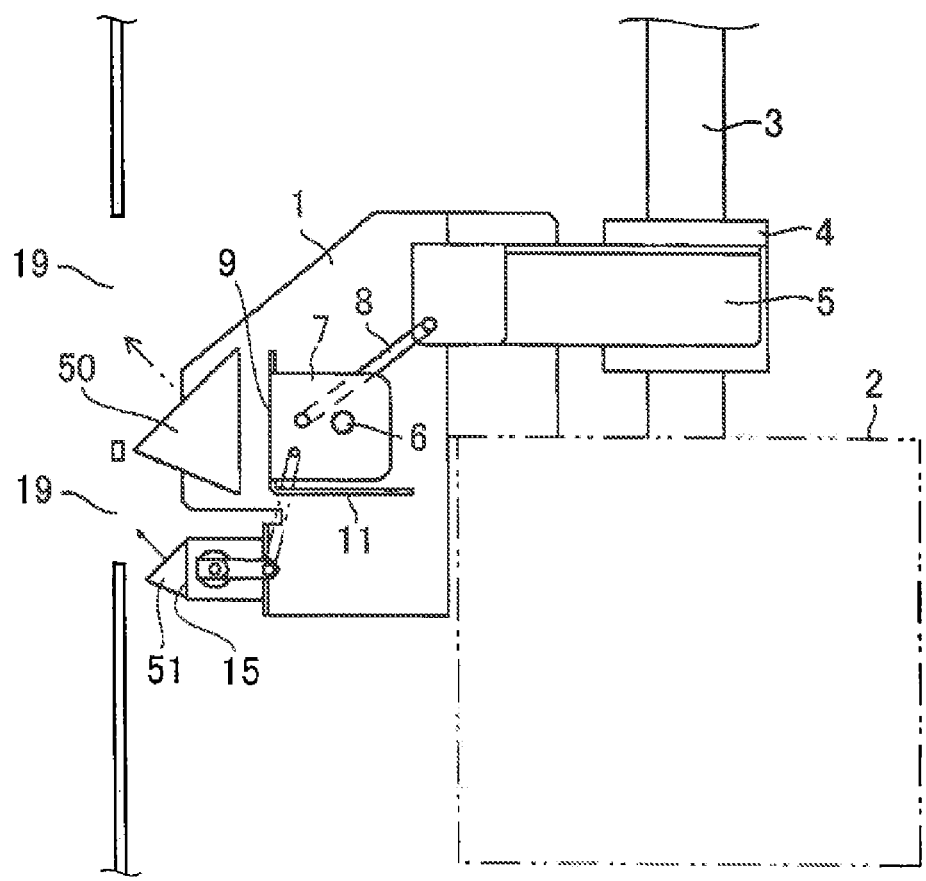
FIG. 7 is a side view showing the contact opening position of a switchgear state display device according to Embodiment 3 of the present invention.

Further, as shown in FIG. 7, while an "OFF" display face 9 or an "ON" display face 11 of an ON/OFF display plate 7 and a display unit of the number of operation times 15 remain pointed in a horizontal direction, and prisms 50, 51 are arranged at the front of the respective display faces; and thus, the display can also be visible from obliquely above by refraction of the prisms 50, 51. Furthermore, even when a mirror is used in place of the prism, similar effects can be obtained.

By such a configuration, the selection of display directions depending on attachment positions (vertical height) is adjusted by only the attaching angle of the prisms or the mirrors, a machine structural display mechanism unit can be commonly manufactured; and therefore, manufacture becomes easy and manufacture costs can be reduced.

Embodiment 4

Figure 8:
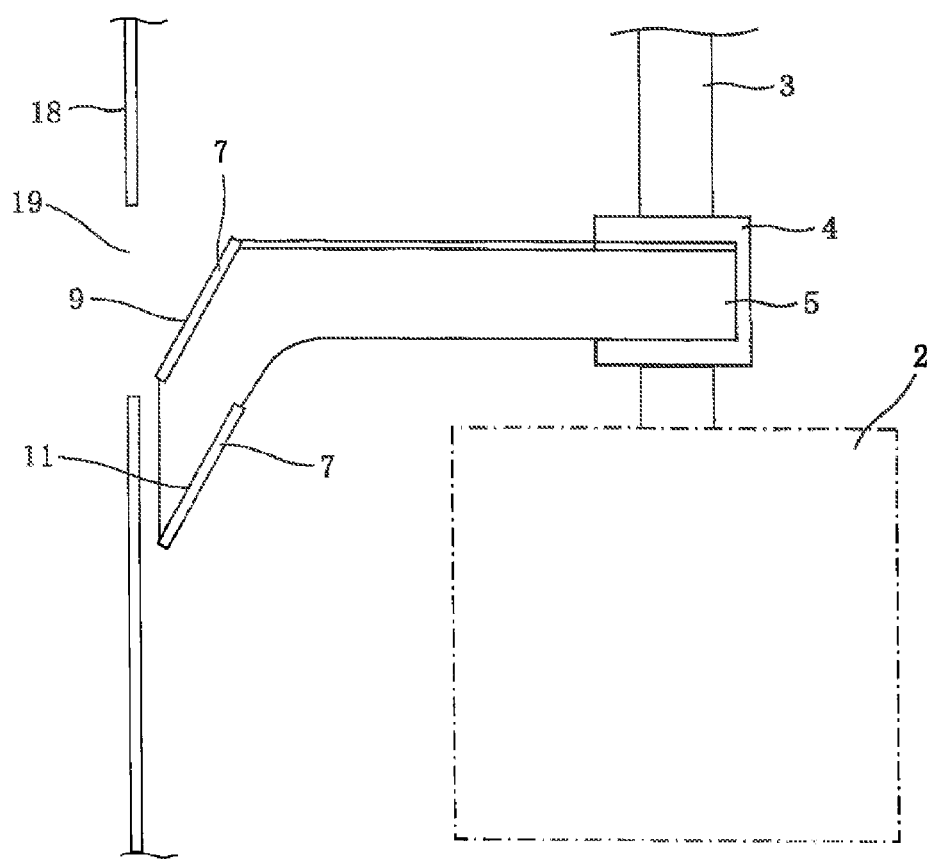
FIG. 8 is a side view showing the contact opening position of a switchgear state display device according to Embodiment 4 of the present invention.
Figure 9:
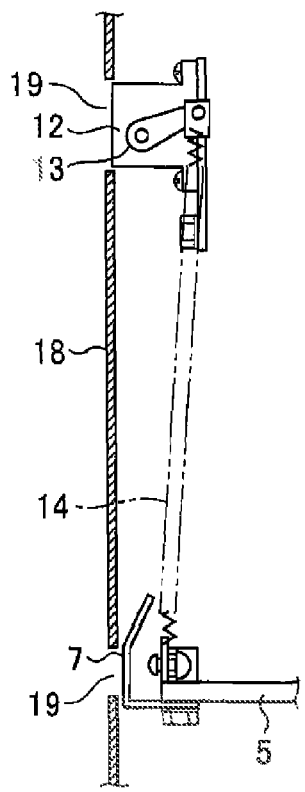
FIG. 9 is a side view showing the contact closing position of a general switchgear state display device.
Figure 10:
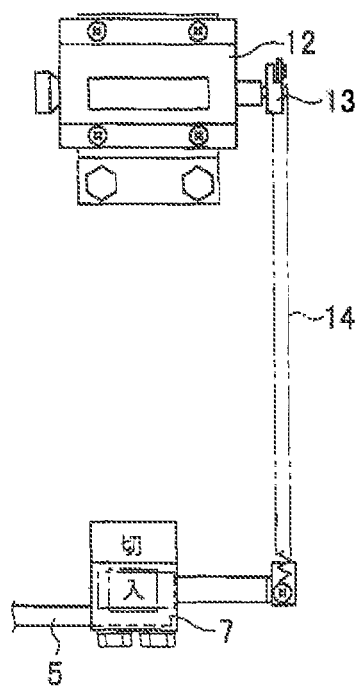
FIG. 10 is a front view of FIG. 9.

In FIG. 8, a movable plate 5 is attached with two parallel ON/OFF display plates 7 whose display faces are pointed in predetermined directions; and the ON/OFF display plates 7 are attached with separated up and down by a distance proportional to movable distance of a main shaft 3 (same distance in the case of FIG. 8).

In the case where a switchgear is at a contact opening position, the "OFF" display face 9 of the ON/OFF display plate 7 is in a state visible from a display window 19 of a front cover 18; and when the switchgear moves from a contact opening position to a contact closing position by contact closing operation, the ON/OFF display plate 7 also moves upward in conjunction with the movement of the main shaft 3. Then, in the case of being at a contact closing position, the "ON" display face 11 of the ON/OFF display plate 7 moves to a position visible from the display window 19 of the front cover 18.

As described above, the contents of the display of the "OFF" state of the ON/OFF display plate 7 or the "ON" state of the ON/OFF display plate 7 can be easily confirmed from the display window 19 of the front cover 18.

Incidentally, in the present invention, the respective embodiments can be freely combined and appropriately changed in shape or omitted within the scope of the present invention.

DESCRIPTION OF REFERENCE NUMERALS

1 Frame, 2 Operating mechanism, 3 Main shaft, 4 Connection block, 5 Movable plate, 7 ON/OFF display plate, 8 ON/OFF display plate link, 9 Display face (OFF), 11 Display face (ON), 12 Operation counter, 13 Driving lever, 14 Tension spring, 18 Front cover, 19 Display window, 20, 21 Circuit breaker, 22 Switchboard, 23 Worker, 24, 25 State display device, 26 Auxiliary switch, 28 Arm, 29 auxiliary contact link, and 30 Auxiliary frame.

The invention claimed is:

1. A switchgear state display device, comprising:
a display plate which is coupled to a main shaft of a switchgear, and is provided with a display showing the state of said switchgear on a first display face and a second display face, so that movement of said main shaft moves the display plate to point either the first display face or the second display face toward a display window of a front cover arranged along a vertical surface of said switchgear by mechanically rotating the display plate or moving the display plate linearly; and
a display plate link which is coupled to said main shaft of said switchgear and said display plate, and converts the movement of said main shaft to said display plate,
wherein a coupling position of said display plate with said display plate link is adjustable via a plurality of connection points; and
the first display face and the second display face points toward to the display window at an angle greater than zero formed by a first line perpendicular to the vertical surface and a second line perpendicular to the first display face or the second display face that is pointing toward the display window, and the other of the first display face and the second display face points in a direction other than towards the display window.

2. The switchgear state display device according to claim 1, further comprising:
a mechanical operation counter which counts a number of opening/closing times of the switchgear by rotation of a driving lever; and
a tension spring which is coupled to said display plate and said driving lever to interlock said display plate with said mechanical operation counter, and
wherein said mechanical operation counter displays the number of opening/closing times at an angle through a second window of the front cover.

3. The switchgear state display device according to claim 1, further comprising:
a rotary auxiliary switch;
a movable plate attached to said main shaft;
an arm which is coupled to a rotational shaft of said auxiliary switch; and
an auxiliary switch link which is coupled to said movable plate and said arm, and converts motion of said movable plate to said auxiliary switch, and
wherein an opening/closing state of a contact is displayed in accordance with movement of the switchgear, and at the same time, said auxiliary switch is switched.

4. The switchgear state display device according to claim 2, further comprising:
a rotary auxiliary switch;
a movable plate attached to said main shaft;
an arm which is coupled to a rotational shaft of said auxiliary switch; and
an auxiliary switch link which is coupled to said movable plate and said arm, and converts motion of said movable plate to said auxiliary switch, and
wherein an opening/closing state of a contact is displayed in accordance with movement of said switchgear, the number of opening/closing times that is counted, and at the same time, said auxiliary switch is switched.

5. A switchgear comprising the switchgear state display device as set forth in claim 1.

6. A switchgear comprising the switchgear state display device as set forth in claim 2.

7. A switchgear comprising the switchgear state display device as set forth in claim 3.

8. A switchgear comprising the switchgear state display device as set forth in claim 4.

9. The switchgear state display device according to claim 1, wherein the angle is adjustable.

10. The switchgear state display device according to claim 1, wherein the first display face faces toward the main shaft when the second display face faces toward the display window.

11. The switchgear state display device according to claim 1, wherein the first display face and the second display face are positioned on the display plate at an angle of 90 degrees relative to each other.

12. The switchgear state display device according to claim 1, wherein the main shaft extends in a direction parallel with the vertical surface of the switchgear.

* * * * *